United States Patent [19]
Philipp

[11] Patent Number: 5,919,831
[45] Date of Patent: Jul. 6, 1999

[54] PROCESS FOR MAKING AN ION EXCHANGE MATERIAL

[76] Inventor: Warren H. Philipp, 26919 Greenbrooke Dr., Olmsted Falls, Ohio 44138

[21] Appl. No.: 09/102,842

[22] Filed: Jun. 23, 1998

Related U.S. Application Data

[63] Continuation-in-part of application No. 08/755,027, Nov. 22, 1996, abandoned, which is a continuation-in-part of application No. 08/565,587, Dec. 1, 1995, abandoned, which is a division of application No. 08/432,364, May 1, 1995, abandoned.

[51] Int. Cl.⁶ .................................. C08J 5/22; C08J 5/20; C08F 8/14; C08F 8/42
[52] U.S. Cl. .............................. 521/31; 521/25; 521/27; 521/30; 525/384
[58] Field of Search .............................. 525/384; 521/27, 521/30, 31, 25

[56] References Cited

U.S. PATENT DOCUMENTS

| | | |
|---|---|---|
| 2,783,212 | 2/1957 | Schnell . |
| 3,861,397 | 1/1975 | Rao . |
| 4,083,782 | 4/1978 | Kunin ......................................... 210/32 |
| 4,747,954 | 5/1988 | Vaughn .................................... 210/670 |

FOREIGN PATENT DOCUMENTS 0 583 086 A1   2/1994   European Pat. Off. .

OTHER PUBLICATIONS

March, "Advanced Organic Chemistry", 4th Ed., (1992) 393, Wiley (New York).

*Primary Examiner*—Fred Zitomer
*Attorney, Agent, or Firm*—Renner, Otto, Boisselle & Sklar, P.L.L.

[57] ABSTRACT

This invention relates to a process for making an ion exchange material, the process comprising:

(A) forming an aqueous solution comprising a water-soluble polymer containing pendent carboxyl groups and a water-soluble polyol, the number of carboxyl groups provided by said polymer being in excess of the number of hydroxyl groups provided by said polyol;

(B) forming a thin film or a composite with the solution from step (A), the composite comprising the solution from step (A) in contact with a support material;

(C) drying the solution to form a dried polymer;

(D) heating the dried polymer from step (C) under esterification conditions to produce a water-insoluble partially esterified crosslinked polymer; and (E) contacting said partially esterified crosslinked polymer from step (D) with alkali or alkaline earth metal ions to form said ion exchange material.

20 Claims, No Drawings

PROCESS FOR MAKING AN ION EXCHANGE MATERIAL

This application is a continuation-in-part of U.S. application Ser. No. 08/755,027, now abandonded, filed Nov. 22, 1996, which is a continuation-in-part of U.S. application Ser. No. 08/565,587, filed Dec. 1, 1995, now abandoned, which is a division of U.S. application Ser. No. 08/432,364, filed May 1, 1995, now abandoned. The disclosures in these prior applications are incorporated herein by reference in their entireties.

TECHNICAL FIELD

This invention relates to a process for making an ion exchange material. The ion exchange material is made in the form of a thin film or composite, the composite being comprised of the ion exchange material in contact with a support material. The ion exchange material is suitable for removing toxic metals from aqueous systems.

BACKGROUND OF THE INVENTION

The alkali and alkaline earth metal salts of polymers containing pendant carboxyl groups (e.g., polyacrylic acid, polymethacrylic acid) exhibit ion exchange properties. These ion exchange materials are sometimes referred to as polycarboxylate ion exchange materials. Unlike many sulfonated ion exchange polymers, which pick up calcium ions in solution, these polycarboxylate ion exchange materials have low calcium selectivity and are therefore effective as toxic metal removers in environments wherein calcium is present. These polymers are generally water soluble and in order to use these polymers as ion exchange materials in aqueous media, it is necessary to convert these water soluble polymers to water insoluble polymers. This is usually accomplished by crosslinking the polymers. The ion exchange materials made from these polymers are typically in the form of beads, powders or granules.

In general there are three prior art processes for making polycarboxylate ion exchange materials. The first of these involves a process in which polymerization and crosslinking are accomplished in a single step. In this process a polymerizable carboxylic acid monomer such as acrylic acid or methacrylic acid is mixed with a crosslinking agent containing at least two polymerizable double bonds (e.g., divinyl benzene, ethylene diacrylamide), and polymerized and crosslinked in a single step. The reaction medium is in bulk, solution or suspension form and the resulting ion exchange resin products are typically in the form of beads, granules or powders. This process is not, however, suitable for making ion exchange materials in the form of thin films or composites due to the fact that the monomers are volatile and often hazardous and as a result it is impractical and sometimes hazardous to conduct the polymerization and crosslinking reactions while the reaction medium is in the form of a thin film or a composite.

The second of these processes involves copolymerization of a mixture of several monomers (e.g., acrylic acid and ethylene) to form a linear, non-crossslinked copolymer. This is accomplished in single step. At least one of the monomers (e.g., acrylic acid) has cationic functionality and by itself forms a water soluble polymer (e.g., polyacrylic acid). However, the other ethylenic monomers (e.g., ethylene) used in making the copolymer forms water insoluble linear polymers. The resulting ion exchange copolymer resins (e.g., polyacrylic acid/polyethylene) are insoluble in water, but can be melted or dissolved in certain organic liquids. These melts or organic solutions may be used to make thin films or composites. However, a disadvantage with this process is that water cannot be used as the polymer solvent.

The third process involves introducing ion functionality as a final step, after polymerization and crosslinking. The ion exchange resin material (e.g., fibers) is produced from non-ion exchange polymer or copolymer usually from solution. These polymers include polyacrylonitrile and polymethyl metharcrylate. The resin produced from these polymers is subjected to hydrolysis which produces carboxylate cation groups in the polymer. The hydrolysis reaction requires drastic treatment steps (e.g., heating with concentrated sulfuric acid or treatment with a halo sulfonic acid) which is not desirable when making thin films or composites.

U.S. Pat. No. 2,783,212 to Schnell discloses a process for preparing a water-insoluble resin capable of exchanging cations in a liquid medium which comprises copolymerizing a mixture including a polymerizable water-soluble organic acid such as acrylic acid, methacrylic acid or vinylsulfonic acid and, a polymerizable organic compound containing at least two polymerizable double bonds (e.g., divinyl benzene, ethylene glycol dimethyl acrylate, or ethylene diacrylamide) in the presence of a polymerization catalyst and condensing the resulting copolymerizate with a compound selected form the group consisting of polyhydric alcohols, polyamines and aldehydes.

The present invention overcomes the problems of the prior art by providing a simplified process for making ion exchange materials in the form of thin films and composites using water as the polymer solvent.

SUMMARY OF THE INVENTION

This invention relates to a process for making an ion exchange material, the process comprising:

(A) forming an aqueous solution comprising a water-soluble polymer containing pendant carboxyl groups, and a water-soluble polyol, the number of carboxyl groups provided by said polymer being in excess of the number of hydroxyl groups provided by said polyol;

(B) forming a thin film or a composite with the solution from step(A), the composite comprising the solution from step (A) in contact with a support material;

(C) drying the solution to form a dried polymer;

(D) heating the dried polymer from step (C) under esterification conditions to produce a water-insoluble partially esterified crosslinked polymer; and (E) contacting said partially esterified crosslinked polymer from step (D) with alkali or alkaline earth metal ions to form said ion exchange material.

DETAILED DESCRIPTION OF THE PREFERRED EMBODIMENTS

The polymers used in step (A) of the inventive process are water-soluble polymers (including homopolymers, copolymers, terpolymers, and the like) containing pendant carboxyl groups. The term "water-soluble" is used herein to refer to polymers wherein at least about 50 grams of the polymer dissolve in one liter of water at 20° C. In one embodiment, these polymers are derived from acrylic acid monomers, alkyl acrylic acid monomers, and combinations thereof. The alkyl acrylic acid monomers typically contain about 3 to about 8 carbon atoms, and in one embodiment about 3 or about 4 carbon atoms. Examples of useful polymers include polyacrylic acid, polymethacrylic acid, and mixtures thereof. Polyacrylic acid is particularly useful.

In one embodiment, the polymers are derived from ethylene monomers, as well as the foregoing acrylic acid and/or alkyl acrylic acid monomers. The presence of ethylene in these polymers tends to reduce the water solubility of the polymers. Thus, the ethylene monomer content of these polymers can not exceed the point where the polymers are no longer water soluble. Examples of useful polymers include ethylene/methacrylic acid copolymers, ethylene/acrylic acid copolymers, and mixtures thereof.

The polymers typically have number average molecular weights in the range of about 2,000 to about 4,000,000, and in one embodiment about 5,000 to about 3,500,000 and in one embodiment about 5,000 to about 3,000,000, and in one embodiment about 5,000 to about 2,500,000, and in one embodiment about 10,000 to about 500,000, and in one embodiment about 15,000 to about 300,000, and in one embodiment about 50,000 to about 300,000.

The polyols are water soluble polyols. The polyols can be monomeric or polymeric. Diols, triols or mixtures thereof are especially useful. Examples of useful monomeric polyols include ethylene glycol, 1,2-propane diol, 1,3-propane diol, glycerine, mannitol, and the like. Also of use are mixtures of two or more of any of the previously listed monomeric polyols. Ethylene glycol and glycerine are especially useful. The polymeric polyols typically have at least one hydroxyl group for every three carbon atoms in the polymeric molecule. An example of a useful polymeric polyol is polyvinyl alcohol. The polymeric polyols typically have number average molecular weights in the range of up to about 200,000, and in one embodiment about 10,000 to about 200,000.

The concentration of the polymer in the aqueous solution during step (A) of the inventive process is typically from about 5% to about 75% by weight, and in one embodiment about 10% to about 60% by weight, and in one embodiment about 10% to about 40% by weight, and in one embodiment about 10% to about 25% by weight. The concentration of polyol in the aqueous solution used during step (A) is typically from about 0.5% to about 20% by weight based on the weight of the polymer in the solution, and in one embodiment about 4% to about 10% by weight. The viscosity of the solution formed during step (A) is typically from about 100 to about 20,000 centipoise at 25° C., and in one embodiment about 800 to about 15,000 centipoise.

The number of carboxyl groups provided by the polymer in step (A) is typically in excess of the number of hydroxyl groups provided by the polyol used in this step. In one embodiment, the ratio of the number of carboxyl groups provided by the polymer to the number of hydroxyl groups provided by the polyol is from about 1.1 to about 100, and in one embodiment about 1.5 to about 100, and in one embodiment about 2 to about 100, and in one embodiment about 2.2 to about 86, and in one embodiment about 2.5 to about 75, and in one embodiment about 3 to about 50, and in one embodiment about 3 to about 25, and in one embodiment about 5 to about 10.

The thin films formed during step (B) typically have thicknesses of about 0.04 to about 1 mm, and in one embodiment about 0.1 to about 0.5 mm. The thin films include coatings adhered to a substrate or support material as well as thin films that stand alone. In one embodiment, the thin films are made by coating a substrate that has a smooth or substantially smooth surface. Examples of such substrates include glass, metal, and polymeric materials exhibiting a low surface energy such as Teflon, and the like. Any known coating technique can be used. These techniques include gravure, reverse gravure, offset gravure, roller coating, brushing, knife-over roll, metering rod, reverse roll coating, doctor knife, dipping, die coating, spraying, curtain coating, and the like. The thin films are thereafter dried and heated pursuant to steps (C) and (D) and then separated from the substrate using known stripping or peeling techniques. In embodiments wherein the film is in the form of a coating and it is not intended to separate the coating from the substrate, the substrate can be made of any material suitable for receiving a coating and the surface of such substrate can have any texture, including a smooth, rough or porous texture.

The composites formed during step (B) are comprised of the solution from step (A) adsorbed on or intermixed with a porous, particulate or fibrous support material. The support material can be organic or inorganic. These include glass or ceramic support materials such as fiber glass, powdered glass, clays, diatomaceous earth, and porous ceramic matrixes. Also included are activated carbon powder and granules. Also included ire cellulose support materials that are hydrophilic, these include cotton fibers, cotton cloth (e.g., canvas, twill, denim, cotton filter cloth, etc.), wood chips, saw dust, paper, cardboard, and the like. When a support material such as cloth that has been treated with a sizing material is used, it is sometimes advantageous to remove the sizing material (e.g., by washing in detergent solution and rinsing with water) prior to coating or treating with the aqueous polymer solution. The weight ratio of the polymer solution from step (A) to the support material in these composites can vary widely. In one embodiment, the weight ratio of the polymer solution from step (A) to support material ranges from about 0.1 to about 10, and in one embodiment about 0.3 to about 5, and in one embodiment about 0.7 to about 2. In one embodiment, the composite is comprised of a thin layer of the solution on the support material, the thickness of the thin layer being in the range of about 0.04 to about 1 mm, and in one embodiment about 0.1 to about 0.5 mm. The composites formed during step (B) can be formed using known mixing or coating techniques.

The drying step (C) is conducted using drying techniques known in the art. The drying temperature is typically in the range of about 20° C. to about 100° C. The drying can be conducted at atmospheric pressure or under vacuum, the absolute pressure used in such vacuums being in the range of about 1 mmHg to atmospheric pressure. The dried product from step (C) typically has a moisture content of less than about 5% by weight, and in one embodiment less than about 1% by weight. The drying step (C) and the heating step (D) can be conducted as a single process step, or they can be conducted in sequence as separate process steps.

The heating step (D) is conducted at a sufficient temperature and for an effective period of time to permit the desired esterification reaction to occur between the polymer and the polyol. This reaction results in a crosslinking of the polymer, the cross linker being the polyol. The temperature is typically in the range of about 100 to about 190° C., and in one embodiment about 110 to about 190° C., and in one embodiment about 120 to about 170° C. The heating time is typically about 1 to about 24 hours, and in one embodiment about 2 to about 12 hours. This heating step can be conducted at atmospheric pressure or under a vacuum, the absolute pressure for such vacuum being in the range of about 1 mmHg to atmospheric pressure. Typically, about 2% to about 50% of the carboxyl groups of the polymer are esterified, and in one embodiment about 2% to about 47%, and in one embodiment about 5 to about 35%, and in one embodiment about 5 to about 25%, and in one embodiment about 9 to about 19%, of the carboxyl groups are esterified.

During step (E), the crosslinked partially esterified polymer is contacted with an aqueous solution of an alkali or alkaline metal compound for an effective period of time to form a salt bond between non-esterified carboxyl groups of the polymer and metal ions of the alkali or alkaline earth metal compounds. The alkali or alkaline earth metals that are useful include sodium, potassium and calcium, or a mixture of two or more thereof. The anionic portion of the alkali or alkaline earth metal compounds that can be used include hydroxides, carbonates, bicarbonates, halides, (e.g., chlorides), acetates, nitrates, and the like. The carbonates and bicarbonates are particularly useful. In one embodiment, ammonia is added to the aqueous solution of the alkali or alkaline earth metal compound; this is particularly useful when calcium (e.g., calcium chloride or calcium nitrate) is used. The concentration of the alkali or alkaline earth metal compound in the aqueous solution is generally an effective amount to react with about 90% to about 100% of the non-esterified carboxyl groups of the polymer, and in one embodiment about 95% to about 100% of the non-esterified carboxyl groups. In one embodiment, the ion exchange material remains immersed (e.g., suspended, settled at the bottom or dispersed) in the aqueous solution of the alkali or alkaline earth metal compound and is supplied to end users in that form. In one embodiment, the ion exchange material is dried using known filtering and/or drying techniques and is provided to the end user in the form of a thin film or a composite. These thin films and composites can be reduced to powders, pellets, flakes, and the like, using known techniques (e.g., grinding, pulverizing, etc.)

In one embodiment, the ion exchange material is in the form of a thin film and is made using an aqueous solution containing about 10% by weight of a polyacrylic acid having a molecular weight of about 3,000,000.

In one embodiment, the ion exchange material is in the form of a composite, the ion exchange material being adhered to the surface of a cloth. The ion exchange material is made using an aqueous solution containing about 25% by weight of a polyacrylic acid having a molecular weight of about 250,000.

In one embodiment, the ion exchange material is in the form of a composite wherein the ion exchange material is impregnated in a porous substrate. The ion exchange material is made using an aqueous solution containing about 50% by weight of a polyacrylic acid having a molecular weight of about 2000.

An advantage of the inventive process is that crosslinking is accomplished in a single independent step (i.e., step (D) or step (C) in combination with step (D)). Because the crosslinking is effected in a single independent reaction step, the process is suitable for a wide variety of fabrication applications to form the desired ion exchange materials. A significant advantage is that the process is conducted using aqueous solutions, that is, without the use of organic solvents.

The ion exchange material made by the inventive process is particularly suitable for removing toxic metals such as lead, cadmium, copper, etc., from aqueous systems on contact via ion exchange. For example, when the ion exchange material is a sodium or calcium salt, the reaction with lead ions can be represented by the following equations, respectively:

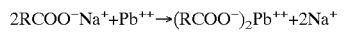

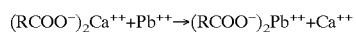

The toxic metal concentration of such aqueous systems can be reduced to levels in the parts per million (ppm) range or less using the ion exchange materials made by the inventive process. For example, the concentration of toxic metals can be reduced below about 100 ppm, and in one embodiment below about 10 ppm using these ion exchange materials, and in one embodiment below about 5 ppm, and in one embodiment below about 1 ppm. An advantage of using these ion exchange materials is that they are effective when calcium is present in the water.

In the following examples, as well as throughout the specification and in the claims, unless otherwise indicated, all parts and percentages are by weight, all temperatures are in degrees Celsius, and all pressures are atmospheric.

EXAMPLE 1

An aqueous solution (500 grams) containing 10% by weight polyacrylic acid (molecular weight of about 3,000,000) is heated to 40° C. and then mixed with 3 grams of glycerine. The resulting solution is spread on a smooth glass surface to form a thin film. The film is dried. The dried thin film has a thickness of 0.25 mm. The dried thin film is removed from the glass, cut into pieces (average size of 10×10 cm) and heated at 130° C. for 10 hours to form a water-insoluble crosslinked partially esterified product. The pieces of water insoluble crosslinked partially esterified product are immersed in one liter of water containing 45 grams of sodium carbonate at room temperature for one hour to provide the desired ion exchange material.

EXAMPLE 2

Example 1 is repeated except that the pieces of water-insoluble crosslinked partially esterified product are immersed in one liter of water containing 35 grams of calcium hydroxide at room temperature for one hour to provide the desired ion exchange material.

EXAMPLE 3

An aqueous solution (100 grams) containing 25% by weight polyacrylic acid (molecular weight of about 250,000) is mixed with 2 grams of glycerine. The resulting solution is mixed with 45 grams of diatomaceous earth to provide a dough-like mixture. This dough-like mixture is extruded through a circular orifice having a diameter of 3.5 mm to provide strands of extruded product. The strands of extruded product are cut into one-centimeter lengths. The cut lengths of extruded product are heated at 150° C. for 8 hours to form a water-insoluble crosslinked partially esterified product in the form of such strands. The strands are mixed with one liter of water containing 15 grams of ammonia and 25 grams of calcium chloride at room temperature for one hour to provide the desired ion exchange material.

EXAMPLE 4

An aqueous solution (100 grams) containing 25% by weight polyacrylic acid (molecular weight of about 250,000) is mixed with 1.5 grams of ethylene glycol. The resulting solution is spread on a smooth glass surface to form a thin film. The film is dried. The dried film has a thickness of 0.25 mm. The dried film is removed from the glass, cut into pieces (average size of 10×10 cm) and heated at 130° C. for 10 hours to form a water-insoluble crosslinked partially esterified product. The pieces of partially esterified crosslinked product are immersed in one liter of water containing 35 grams of calcium hydroxide at room temperature for 24 hours to provide the desired ion exchange material.

EXAMPLE 5

An aqueous solution (150 grams) containing 25% by weight polyacrylic acid (molecular weight of about 250,000) is mixed with 2.25 grams of glycerine. The resulting solution is coated on a piece denim, the denim having the dimensions of 50×50 cm. The coating is dried. The dried coating is heated at 130° C. for 10 hours to form a water-insoluble crosslinked partially esterified coating on the denim. The coated denim is immersed in one liter of water containing 25 grams of calcium hydroxide at room temperature for 10 hours to provide the desired ion exchange material.

EXAMPLE 6

Activated carbon in granular form (100 grams) is mixed with an aqueous solution (100 grams) containing 25% polyacrylic acid (molecular weight of about 250,000) and 2 grams of glycerine. The resulting mixture is poured on to a pyrex dish and allowed to dry. The dried mixture is heated at 160° C. for 3 hours to provide a water-insoluble crosslinked partially esterified composite product. This product is contacted with a one-liter aqueous solution containing 15 grams of ammonia and 25 grams of calcium chloride at room temperature for one hour to provide the desired ion exchange material.

EXAMPLE 7

An aqueous solution (100 grams) containing 25% by weight polyacrylic acid (molecular weight of about 250,000) is mixed with 2.5 grams of glycerine. The solution is poured onto a 9×12 inch pyrex tray. The polymer solution is spread evenly over the bottom of the tray and allowed to dry. The dried film is cut into pieces (about 2×2 inch), and then heated at 170° C. for 2 hours to provide a water-insoluble crosslinked partially esterified product. This product is immersed in water and ground in a blender to form a granular product. The granules are immersed in one liter of water containing 25 grams of sodium carbonate to provide the desired ion exchange material.

EXAMPLE 8

Example 7 is repeated except that the granules (20 grams) are mixed with one liter of water containing 15 grams of ammonia and 25 grams of calcium chloride to provide the desired ion exchange material.

EXAMPLE 9

Example 7 is repeated except that 2.5 grams of ethylene glycol are used in place of the glycerine.

EXAMPLE 10

An aqueous solution (100 grams) containing 25% by weight polyacrylic acid (molecular weight of about 250,000) is mixed with 1.5 grams of glycerine with stirring. This solution is coated on a canvas substrate and allowed to dry. The coated canvas substrate is heated for 10 hours at 130° C. to provide a water-insoluble crosslinked partially esterified coating. The coating is contacted with one liter of water containing 30 grams of calcium hydroxide at room temperature to provide the desired ion exchange material.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A process for making an ion exchange material, comprising:
   (A) forming an aqueous solution comprising a water-soluble polymer containing pendent carboxyl groups, and a water-soluble polyol, the number of carboxyl groups provided by said polymer being in excess of the number of hydroxyl groups provided by said polyol;
   (B) forming a thin film or a composite with the solution from step (A), the composite comprising the solution from step (A) in contact with a support material;
   (C) drying the solution to form a dried polymer;
   (D) heating the dried polymer from step (C) under esterification conditions to produce a water-insoluble partially esterified crosslinked polymer; and
   (E) contacting said partially esterified crosslinked polymer from step (D) with alkali or alkaline earth metal ions to form said ion exchange material,
   wherein said ion exchange material is suitable for removing toxic metals from aqueous systems.

2. The process of claim 1 wherein in said polymer in step (A) is polyacrylic acid, polymethacrylic acid, ethylene/acrylic acid copolymer, ethylene/methacrylic acid copolymer, or a combination of two or more thereof.

3. The process of claim 1 wherein said polymer in step (A) is polyacrylic acid.

4. The process of claim 1 wherein said polymer in step (A) has a number average molecular weight in the range of about 2,000 to about 4,000,000.

5. The process of claim 1 wherein said polyol in step (A) is a diol, triol, or mixture thereof.

6. The process of claim 1 wherein said polyol is a polymeric polyol.

7. The process of claim 1 wherein said polyol in step (A) is ethylene glycol, 1,2-propane diol, 1,3-propane diol, glycerine, mannitol, polyvinyl alcohol or a mixture of two or more thereof.

8. The process of claim 1 wherein the ratio of the number of carboxyl groups provided by said polymer to the number of hydroxyl groups provided by said polyol in step (A) is from about 1.1 to about 100.

9. The process of claim 1 during step (B) said solution from step (A) is coated on a substrate to form said thin film.

10. The process of claim 9 wherein said thin film is separated from said substrate.

11. The process of claim 9 wherein said substrate has a surface that is smooth, rough or porous.

12. The process of claim 1 wherein said support material is a porous, particulate or fibrous material.

13. The process of claim 1 wherein said polymer is heated at a temperature in the range of about 100° C. to about 190° C. during step (D).

14. The process of claim 1 wherein said alkali or alkaline earth metal ions in step (E) are sodium, potassium, calcium, or a mixture of two or more thereof.

15. The process of claim 1 wherein step (E) is conducted using an aqueous composition containing said alkali or alkaline earth metal ions.

16. The process of claim 15 wherein during step (E) said partially esterified crosslinked polymer is immersed in said aqueous composition and said ion exchange material is formed in said aqueous composition.

17. The process of claim 16 wherein said ion exchange material is dried.

18. The process of claim 1 wherein said ion exchange material is in the form of a thin film or a composite.

19. The process of claim 1 wherein said ion exchange material is in powder, pellet or flake form.

20. A process for forming an ion exchange material comprising:

(A) forming an aqueous solution comprising: polyacrylic acid; and a polyol selected from the group consisting of ethylene glycol, glycerine, and a combination thereof; the number of carboxyl groups provided by said polyacrylic acid being in excess of the number of hydroxyl groups provided by said polyol;

(B) forming a thin film or a composite with the solution from step (A), the composite comprising the solution from step (A) in contact with a support material;

(C) drying the solution to form a dried polymer;

(D) heating the dried polymer from step (C) under esterification conditions to produce a water-insoluble partially esterified crosslinked polymer; and (E) contacting said partially esterified crosslinked polymer from step (D) with alkali or alkaline earth metal ions to form said ion exchange material, wherein said ion exchange material is suitable for removing toxic metals from aqueous systems.

* * * * *